June 28, 1966  H. V. HENDERSON  3,257,967
DRIVES FOR OVERHEAD HAULAGE VEHICLES
Filed July 6, 1965  2 Sheets-Sheet 1

FIG. I.

INVENTOR
HERBERT VICTOR HENDERSON

BY *Shoemaker and Mattare*

ATTORNEYS

INVENTOR
HERBERT VICTOR HENDERSON
By Shoemaker and Mattare
Attys.

United States Patent Office 3,257,967
Patented June 28, 1966

3,257,967
DRIVES FOR OVERHEAD HAULAGE VEHICLES
Herbert V. Henderson, Germiston, Transvaal, Republic of South Africa, assignor to Anglo-Transvaal Consolidated Investment Company Limited, Johannesburg, Transvaal, Republic of South Africa
Filed July 6, 1965, Ser. No. 469,539
Claims priority, application Republic of South Africa, July 10, 1964, 64/3,273
5 Claims. (Cl. 105—30)

This invention relates to drives for overhead haulage vehicles and more particularly to locomotives coupled to propel one or more carriages or tubs with the train suspended from an overhead track.

It will be appreciated that it is desirable to drive locomotives such as those above referred to with sufficient adhesion between the driving wheels and rails to propel the load at a given time and under the particular existing circumstances without slippage between drive wheels and rails while at the same time not applying unnecessarily large pressures to the drive wheels.

The object of the present invention is to provide a drive arrangement for such vehicles wherein the pressure applied by the drive wheels to the rails will vary automatically with the load to be moved.

According to this invention there is provided a locomotive adapted to be driven on an overhead track said locomotive comprising a rigid frame, wheels adapted to engage upper and lower surfaces of the track carried by said frame, at least one of the wheels being a driven wheel, and at least one wheel positioned to act on one track surface being movably mounted on the frame, a slave hydraulic piston and cylinder assembly supporting said movable wheel, a master hydraulic piston and cylinder assembly mounted on the frame, a draw-bar mounted to have relative longitudinal movement with respect to the frame with said movement of the draw-bar controlling the master piston and cylinder assembly.

The invention also provides for the draw-bar to operate a cam to control the master piston and cylinder assembly, for there to be a pair of oppositely disposed cams pivotally mounted on the frame to control the master piston and cylinder assembly one for each direction of movement of the draw-bar.

A preferred embodiment of this invention will be described with reference to the accompanying drawings in which.

Figure 1:
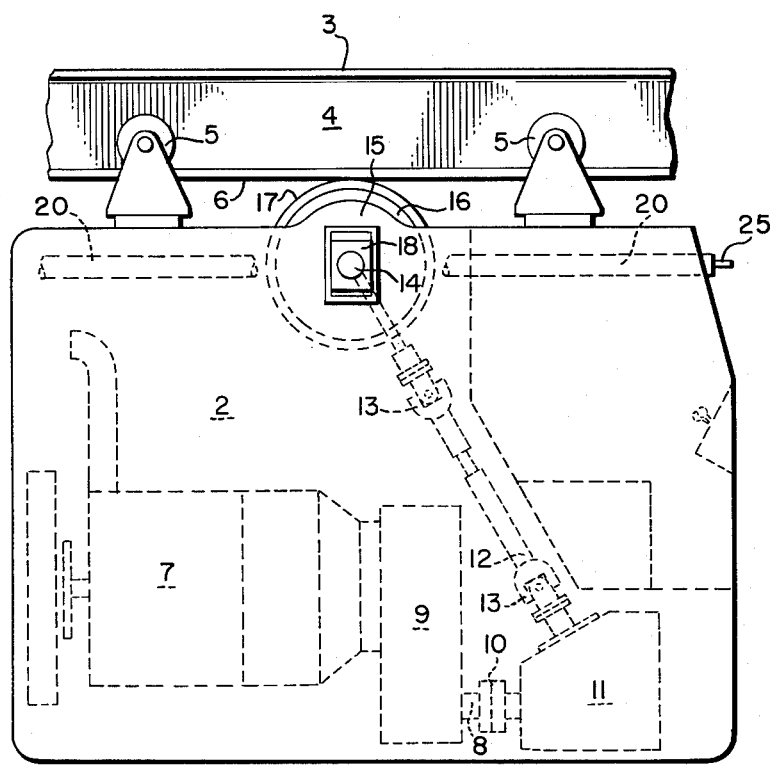
FIG. 1 is a general diagrammatic view of a locomotive.

It will be appreciated that the monorail locomotive illustrated in FIG. 1 is only one form of locomotive suitable for use with the present invention. Other constructions may be used provided either the drive or running wheels and the draw-bar are supported by but movable relative to the locomotive frame in the manner set forth above.

Briefly then with regard to FIG. 1 a practical form of locomotive 1 comprises a rigid frame 2 suspended from a track 3 which may conveniently be in the form of an I beam 4. The frame 2 is supported from two pairs of running wheels 5 which wheels are rotatably mounted on axles located towards the ends of the frame which axles will preferably be secured to the frame 2 in any convenient manner in swivel mountings which ensures that no longitudinal or vertical displacement of these wheels 5 relative to the frame 2 can take place.

As shown the wheels 5 run on the upper surfaces of the lower flanges 6 of I beam 4.

The frame 2 also houses the prime mover for the locomotive which may be a diesel engine 7 illustrated by the dotted lines representation and the drive 8 from this engine is connected either directly or through a torque convertor 9 by a coupling 10 to a suitable reduction gearing unit 11. The output from the unit 11 is connected by means of an extensible drive shaft 12 and universal joints 13 to the shaft 14 of a single drive wheel assembly 15.

The assembly 15 is mounted in the frame 2 so that drive wheel 16 engages the undersurface of flanges 6 of I beam 4. The wheel 16 is preferably provided with a resilient tyre 17 made of material which will promote frictional engagement between wheel 16 and flange 6.

The drive wheel 16 is located in a central position relative to the running wheels 5 and the axle therefor is supported in bearing blocks 18.

The locomotive frame 2 also embodies an operator's cab with the necessary controls for operation of the locomotive.

Spring means (not illustrated) may be incorporated in the assembly to ensure that a certain minimum pressure is applied to the wheel supports to ensure engagement between tyre 17 and the track surface.

The lowest position of the drive wheel 16 is made to afford sufficient adhesion to drive at least the locomotive on its own without any load such as a train of carriages or tubs.

Figure 2:
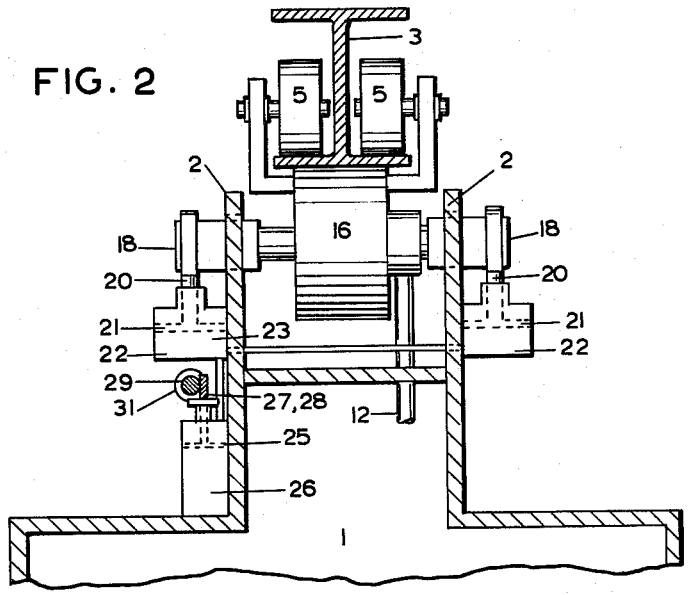
FIGS. 2 and 3 are diagrammatic representations illustrating the operation of this invention.
Figure 3:
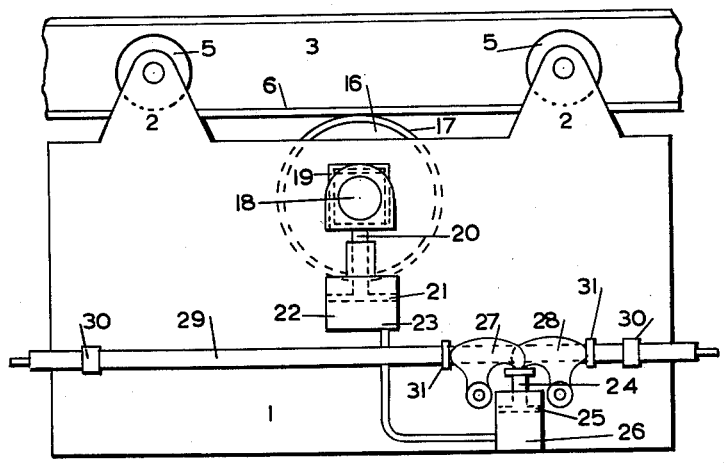

Referring now more particularly to diagrammatic drawings of FIGS. 2 and 3 it will be seen that the bearing blocks are located in robust guides 19 in a manner which allows a limited vertical movement of the wheel 16 relative to the surface of the track 3 engaged by wheel 16.

Each bearing block 18 for the drive wheel 16 is supported on the outer end of a piston rod 20 of a slave hydraulic piston 21 and cylinder 22 assembly so that it may move towards and away from the undersurface of the track 3. The part 23 of the cylinder 22 on the operative side of the piston 21 is in direct communication with the cylinder 24 of a master piston 25 and cylinder 24 assembly which is rigidly supported on the locomotive frame 2 and the projecting end of the piston rod 26 extending from master piston 25, has a surface on which parts of a pair of oppositely disposed cams 27, 28 may move to depress this piston 25. The cams 27, 28 are pivotally mounted on the frame 2 and in the path of movement of a draw-bar 29 for the locomotive 1 to which the train of tubs is to be coupled.

The draw-bar 29 is mounted in guides 30 in such a way that it may move to a limited extent longitudinally of the locomotive frame 2 and carries projections 31 co-operating with the cams 27, 28 mentioned above so that movement in either direction will cause one or other of the cams 27, 28 to depress the piston 25 of the master piston and cylinder assembly. This will cause the slave piston 21 to move upwards and consequently press the drive wheel 16 into tighter engagement with the track surface.

In use the load in the form of the train of ore tubs is coupled to the locomotive draw-bar 29 and this load acts through the draw-bar as above described to apply the necessary pressure between drive wheel 16 and track 3 to move the load without slippage. The force applied to the wheel 16 by the action of the load is dependent on the respective diameters of the master and slave cylinders of the two pistons and cylinder assemblies.

It will be understood that suitable stops will be provided in the assembly to prevent the pressure between drive wheel 16 and track 3 from being reduced below a predetermined minimum.

The variable drive above described may be made to have very little friction between the moving parts and the limited movement of the drive wheel 16 will enable the drive mechanism to be of simple and robust construction.

The wheel arrangement described in the above example may be varied and also more than one wheel may be driven if this is desirable. Also, if desired the automatic adjustment of the pressure of engagement between the wheels and track can be made to operate on all track engaging wheels.

What I claim as new and desire to secure by Letters Patent is:

1. A locomotive adapted to be suspended from an overhead track said locomotive comprising a rigid frame, wheels adapted to engage upper and lower surfaces of the track carried by said frame at least one of the wheels being a driven wheel, at least one wheel positioned to act on one track surface being movably mounted on the frame, a slave hydraulic piston and cylinder assembly, supporting said movable wheel, a master hydraulic piston and cylinder assembly mounted on the frame, a drawbar mounted to have relative longitudinal movement with respect to the frame with said movement of the draw-bar controlling the master piston and cylinder assembly.

2. A locomotive as claimed in claim 1 in which a cam is pivotally supported on the frame and operated by the draw-bar to control the master piston and cylinder assembly.

3. A locomotive as claimed in claim 1 in which a slave piston and cylinder assembly is provided on each side of the plane of rotation of the movable wheel.

4. A locomotive adapted to be suspended from an overhead track, said locomotive comprising a rigid frame, a pair of track engageable running wheels positioned towards each longitudinal end of said frame, and a drive wheel positioned to engage the opposite surface of the track to the running wheels carried by the frame, said drive wheel located substantially centrally between the pairs of running wheels and movably mounted on a pair of slave hydraulic piston and cylinder assemblies positioned one on each side of the plane of rotation of the drive wheel, a master hydraulic piston and cylinder assembly mounted on the frame, a drawbar for the locomotive mounted to have relative longitudinal movement with respect to the frame, and a pair of oppositely directed cams pivotally mounted on the frame and each having a surface co-operating with the draw bar to control the master piston and cylinder assembly with movement of the drawbar in one direction relative to the frame.

5. A locomotive as claimed in claim 4 in which the drive wheel is positioned to engage the under surface of the track.

References Cited by the Examiner

UNITED STATES PATENTS

| | | | |
|---|---|---|---|
| 1,078,102 | 11/1913 | Manly | 105—30 |
| 2,018,087 | 10/1935 | Plass | 105—153 |

FOREIGN PATENTS 825,288  12/1959  Great Britain.

ARTHUR L. LA POINT, *Primary Examiner.*

B. FAUST, *Assistant Examiner.*